Dec. 19, 1961 W. P. SCHMITTER 3,013,410
COUPLING COVER
Filed April 11, 1960
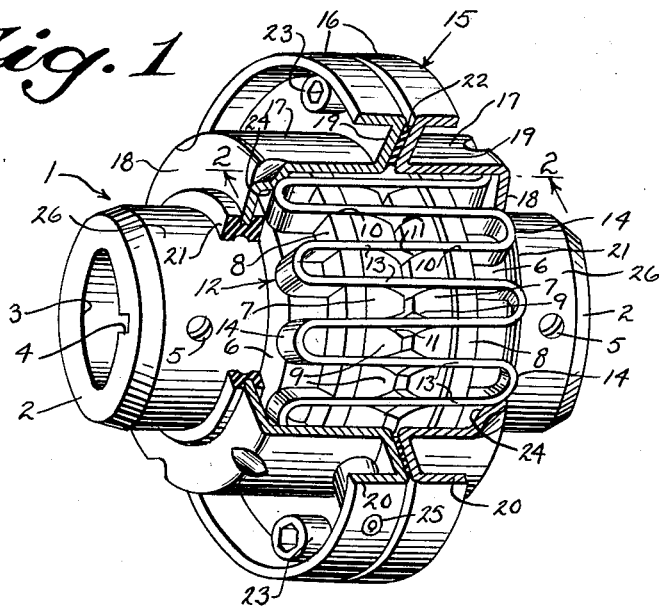
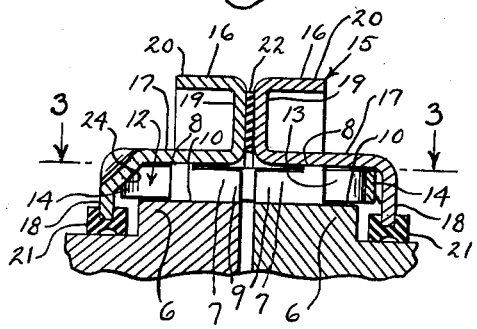
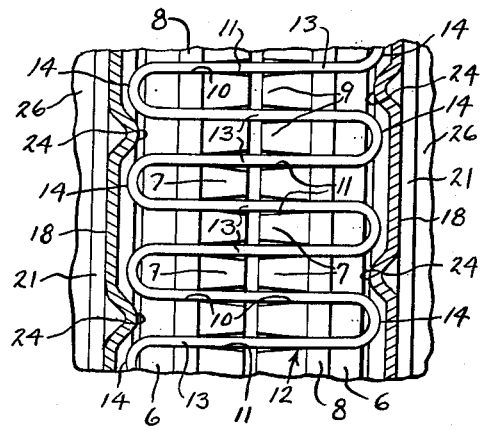
INVENTOR
WALTER P. SCHMITTER
BY *Adrian L. Bateman, Jr.*
ATTORNEY

United States Patent Office 3,013,410
Patented Dec. 19, 1961

3,013,410
COUPLING COVER
Walter P. Schmitter, Wauwatosa, Wis., assignor to The Falk Corporation, Milwaukee, Wis., a corporation of Wisconsin
Filed Apr. 11, 1960, Ser. No. 21,210
5 Claims. (Cl. 64—15)

This invention relates to flexible shaft-couplings; and it more particularly resides in such a coupling having a pair of substantially coaxial hubs arranged in a facing relationship, with torque transmitting means drivingly connecting the hubs, and a cover coaxial with the hubs and arranged to be positively driven by the torque transmitting means without itself becoming a torque transmitting element.

Flexible shaft-couplings in common use often employ a pair of substantially coaxial, facing hubs, each of which is provided, at the end facing the other hub, with a series of circumferentially spaced, radially projecting teeth defining therebetween a series of axial grooves, the grooves in one hub corresponding with the grooves in the other. Interlaced through the corresponding grooves of the respective hubs is a resilient connecting grid element which is engageable with the teeth of both hubs to transmit torque from one to the other.

Among the major advantages of such a coupling construction is the torsional resilience permitted by the grid element, which is equally effective in either direction of rotation. For this reason, couplings of the aforesaid type find frequent application in service requiring starting, stopping, change of speed and/or reversal of the driving element.

The resilient grid element of such a coupling is normally made of sufficient length to extend rearwardly of the teeth of at least one of the hubs in order to allow for effective torque transmission under conditions of axial misalignment between the driving and driven shafts and/or axial float of either of said shafts.

It has long been considered necessary to provide a cover for use in conjunction with such a coupling to prevent damage to its coupling surfaces by the intrusion of dust or dirt, to retain suitable lubricants in contact with the coupling surfaces and to serve as a general protective shield for the coupling. In order to accomplish these objectives, while not interfering with the desirable functions of the coupling itself, such covers are required to be possessed of several properties. First, they must be capable of acting as a dirt barrier and lubricant retainer. Second, they must be capable of easy disassembly to allow access to the coupling. Third, they must be resiliently mounted on the hubs in order to allow the coupling to compensate for axial misalignment of the shafts. Fourth, they must be somewhat slidable relative to the hubs in order to allow for compensation for axial float. Fifth, they must be rotatable to some degree relative to the hubs in order that they will not affect the torsional resilience of the coupling and in order that they, themselves, will not become torque transmitting elements. Finally, they must be relatively inexpensive in order to avoid an undue increase in the cost of the coupling itself.

The previously devised covers which have been most effective in fulfilling the foregoing requirements have utilized a pair of substantially indentical cover portions, each such cover portion having its outer end mounted on its respective hub by means of a sealing ring of rubber or other suitable material, the inner ends of the cover portions being rigidly but releasably joined together to form a central portion preferably seated on the peripheral surfaces of the teeth. The resulting cover effectively covers the coupling surfaces to act as a dirt barrier and lubricant retainer, while its split construction allows for easy disassembly, low manufacturing cost and simplified stocking of replacement parts. Since the two outer ends of the cover portions are mounted on the coupling through the resilient rubber sealing rings while only the central portion is in contact with the teeth, for stability, the cover as a whole will not interfere with the resilience of the coupling in compensating for axial misalignment. In addition, the sealing rings will slide on the hubs and thus will not hinder the coupling in compensating for axial float. Finally, the sealing rings are rotatable relative to the coupling hubs and thus allow for torsional resilience and prevent the cover from itself becoming a torque transmitting element.

Such covers are, however, possessed of a considerable degree of angular inertia and stopping, starting, reversing or change of speed of the driving shaft will often cause the cover to "free-wheel" about the coupling, thereby causing excessive wear on the sealing rings and the cover itself. Several methods have been tried to eliminate this "free-wheeling" effect, but none have, heretofore, proven successful. For example, it has been suggested that the coupling covers be firmly fixed to the hubs, but this solution results in a loss of the aforementioned free floating effect provided by the resilient grid element and thereby impairs the operation of the coupling. Attempts have been made to longitudinally pin the cover to one or both of the hubs, but this expedient has proven both costly and ineffective, often resulting in shearing of the pins. Other prior coupling covers have utilized friction means to provide braking resistance to the rotation of the cover relative to the hub. Such devices have, however, necessitated the insertion of additional parts into the completed coupling, thereby increasing its manufacturing and assembling costs. In addition, such braking devices are subject to wear and their replacement necessitates disassembly of the entire coupling structure. Thus, no one has, as yet, been able to devise positive, effective stop means to limit the relative rotation of the hub and the cover while still allowing the cover to function independently of the coupling with regard to torque transmission and stress.

Accordingly, it is an object of this invention to provide positive means to limit but not eliminate the relative rotation of the coupling cover and the hub elements, whereby the hub elements may still be allowed limited rotation relative to each other.

It is another object of this invention to provide rotation limiting means carried in the cover itself while allowing for construction of the cover in identical half portions.

It is a further object of this invention to provide rotation limiting means which may be incorporated into the cover simply and inexpensively.

These and other objects and advantages will be found in the description to follow. In the description, reference is made to the accompanying drawing, forming a part hereof, in which there is shown by way of illustration and not of limitation a preferred embodiment of this invention.

In the drawing:

FIG. 1 is a view in perspective with parts broken away and in section of a coupling embodying the present invention;

FIG. 2 is a fragmentary view in cross section of the embodiment of FIG. 1 taken along the plane 2—2 shown therein, looking in the direction of the arrows;

FIG. 3 is a developed fragmentary view in cross section of the embodiment of FIG. 1 taken along the plane 3—3 of FIG. 2, looking in the direction of the arrows.

Referring now to the details of the drawing, the reference character 1 designates a flexible shaft-coupling generally. The coupling 1 comprises cylindrical hub elements 2, formed of steel or other material of suitable strength, arranged in a substantially coaxial facing relationship. Each of the hub elements 2 may be either the driving or driven element of a coupling installation. Each hub element 2 is provided with an axial opening 3 into which a shaft (not shown) may be inserted. The shafts may be drivingly secured within the axial openings 3 in any suitable manner, such as by a key (not shown) fitting in a keyway 4. A set screw 5 may be utilized, if desired, to secure the key within the keyway.

Each of the hub elements 2 is further provided, at the end thereof facing the other hub element, with a radially projecting stop flange 6 provided with a series of circumferentially spaced radially projecting teeth 7 circumjacent the stop flange 6. Each tooth 7 has a relatively raised rear portion 8 and a relatively indented front portion 9. The hub elements 2 also include a cylindrical surface 26 generally concentric with the axial opening 3.

Lying between and defined by the adjacent surfaces of the teeth 7 is a series of axial grooves 10, each provided with a slight flare 11 adjacent the faces of the respective hub elements 2.

Interlaced through the grooves 10, and thereby drivingly connecting the hub elements 2, is a resilient grid element 12, formed of steel or any other suitable resilient material, and consisting of torque transmitting limbs 13 and spaced connecting end loops 14. Although the grid element shown herein is formed as a continuous tape-like strip disposed about the hub elements in a serpentine fashion, it will be obvious that other forms of grids, such as those using individual, unconnected grid elements, could be utilized without departing from the spirit of the invention.

Referring to FIG. 1, it can be seen that the limbs 13 fit relatively tightly within the grooves 10 at the rear of the teeth 7, while the flares 11 allow for play on either side of the limbs at the front of the teeth.

Mounted on the hub elements 2 and enclosing the operative coupling elements is a coupling cover, designated generally at 15, formed of substantially identical cover portions 16. Each of the cover portions 16 consists of a body 17 which is preferably in seating engagement with the raised rear portions 8 of the teeth of its respective hub to provide additional stability, an inwardly turned radial flange 18, an outwardly turned radial flange 19 and a circumferential guard flange 20. Sealing rings 21, formed of a resilient material such as rubber, are mounted between the inwardly turned flanges 18 and the respective hub element surfaces 26, and serve to mount the cover portions 16 to the hub elements 2 and also to retain lubricant within the coupling cover. A gasket 22, formed of any suitable material such as cork, operates as a seal between the outwardly turned flanges 19. Bolts 23 serve to releasably hold together the cover portions 16 and to complete the necessary lubricant seal.

At the juncture of the body portion 17 and the inwardly turned flange 18 of each cover portion 16, there are formed a plurality of generally wedge-shaped detents 24. Detents 24 may be formed by a simple stamping process in a drawn cover such as that shown herein, by being integrally cast into the cover portions or by any other suitable method of manufacture. As seen in FIG. 3, the detents 24 are oriented so that when the cover is in place they fall between loops 14. The detents are of sufficient size to prevent the free rotation of the cover 15 about the hub elements 2 while still allowing for some degree of relative rotational movement. It is preferred that the surfaces of the detents 24 be blunt or generally rounded to provide a substantially spherical seat against the loops 14 and to thereby prevent locally severe stresses and attendant wear.

Suitable means, such as fitting 25, may be provided for insertion of lubricants into the coupling cover.

In operation, with the coupling secured to driving and driven shafts, the resilient grid limbs 13, operating against the teeth 7 of each hub element 2, transmit the torque from driving to driven shaft. Due to the play allowed by the groove flares 11, the hub elements 2 are capable of a limited degree of relative rotation which, coupled with the resilient nature of the limbs 13, serves to provide torsional resilience and to thereby dampen the shocks created in starting, stopping, reversal or speed change.

As the coupling commences its rotation, the cover 15, being relatively free to rotate with respect thereto, is caused, by its inertia, to rotate to a position wherein the detents 24 of one or both of the cover portions 16 come into engagement with their adjacent end loops 14, such engagement causing rotation of the cover in a direction and at a speed corresponding to that of the coupling. Upon stopping, reversal, or change of speed of the coupling, the cover 15 rotates incrementally to a point where the detents 24 of one or both of the cover portions 16 come into contact with the respective end loops 14 on their opposite sides, whereupon the relative rotational movement of the cover 15 is stopped. Thus, the coupling cover 15 is limited by positive stop means, constituting detents 24, while the torsional resilience of the coupling is unimpaired.

For purposes of disclosure, the embodiment illustrated herein provides sufficient detents 24 to occupy every third space between end loops 14. It should be understood, however, that is is necessary to the invention only that sufficient detents be provided, on one or both cover portions, to effectively limit the relative rotation of the coupling cover.

Thus, a preferred embodiment of the invention has been shown and described. It is desired that it be understood, however, that the invention is not to be limited to the specific form or arrangement of parts herein except insofar as such limitations are contained in the following claims.

I claim:

1. In a flexible shaft-coupling the combination comprising: a pair of substantially coaxial rotatable hubs arranged in a facing relationship; means drivingly connecting the hubs, said means extending outwardly of at least one of said hubs to present a plurality of spaced projections circumjacent said last mentioned hub; a cover substantially coaxial with said hubs and capable of rotational movement relative thereto; and a plurality of detents carried by said cover and extending into certain of the spaces between said projections to be engageable with certain of said projections, said detents being smaller than the spaces between said projections to limit the rotational movement of said cover relative to said hubs.

2. In a flexible shaft-coupling the combination comprising: a pair of facing, substantially coaxial hubs capable of limited relative rotational movement; resilient means drivingly connecting the hubs, said means extending outwardly of at least one of the hubs to present a plurality of resilient, spaced projections circumjacent said hub; a cover substantially coaxial with said hubs and capable of rotation relative thereto; and a plurality of elements carried by the cover and extending into certain of the spaces between said projections to be engageable with certain of the projections, said elements being smaller than said spaces to permit a predetermined limited rotational movement of the cover relative to the hubs, while preventing relative rotation in excess of the predetermined limit.

3. In a flexible shaft-coupling the combination comprising: a pair of substantially coaxial hubs arranged in a facing relationship; means drivingly connecting the hubs, said means extending outwardly of at least one of said hubs to present a plurality of spaced projections circumjacent said hub; a cover substantially coaxial with said hubs and capable of rotation relative thereto; and a plurality of wedge-shaped detents carried by said cover, said detents projecting into a selected number of the spaces between said projections, said spaces between said projections being larger than said detents to provide for limited relative rotational movement of said cover relative to said hubs.

4. In a flexible shaft-coupling the combination comprising: a pair of substantially coaxial hubs arranged in a facing relationship; resilient means drivingly connecting the hubs, said means extending outwardly of at least one of said hubs to present a plurality of spaced projections circumjacent said hub; a pair of substantially identical cover portions arranged in an opposed relationship, one of said cover portions being substantially coaxial with one of said hubs and capable of rotation relative thereto, and the other of said cover portions being substantially coaxial with the other of said hubs and capable of rotation relative thereto, at least one of said cover portions having integrally formed detents presenting blunt surfaces extending into certain of the spaces between said projections to be engageable with certain of said projections, said detents being smaller than the spaces between said projections to provide for a limited rotational movement of said cover portion relative to said hub; and means operatively connecting said cover portions.

5. In a flexible shaft-coupling, the combination comprising: a pair of substantially coaxial hubs; resilient grid means drivingly connecting the hubs, said grid means extending from each of said hubs to present a plurality of spaced resilient projections circumjacent said hubs; a pair of substantially identical cover portions arranged in an opposed relationship, one of said cover portions being mounted on one of said hubs and capable of rotation relative thereto and having a plurality of detents extending into certain of the spaces between said projections on said one hub to be engageable with certain of the grid projections adjacent said hub, said detents being smaller than the spaces between said projections to provide for limited rotational movement of said cover portion relative to said hub, and the other of said cover portions being mounted on the other of said hubs and capable of rotation relative thereto and having thereon a plurality of detents extending into certain of the spaces between said projections on said other hub to be engageable with certain of the grid projections adjacent said other hub, said detents being smaller than the spaces between said projections to provide for limited rotational movement of said other cover portion relative to said other hub; and means rigidly and releasably connecting said cover portion.

References Cited in the file of this patent

UNITED STATES PATENTS

| 1,343,121 | Francke | June 8, 1920 |
| 2,045,565 | Belcher | June 30, 1936 |

FOREIGN PATENTS

| 439,966 | Great Britain | Dec. 18, 1935 |